No. 771,332. PATENTED OCT. 4, 1904.
J. SPLITDORF.
INDUCTION COIL.
APPLICATION FILED FEB. 23, 1904.
NO MODEL.

Witnesses
Edward Rowland
Rose A. Etherson

Inventor
John Splitdorf
By his Attorney
F. W. Barker

No. 771,332. Patented October 4, 1904.

UNITED STATES PATENT OFFICE.

JOHN SPLITDORF, OF NEW YORK, N. Y.

INDUCTION-COIL.

SPECIFICATION forming part of Letters Patent No. 771,332, dated October 4, 1904.

Application filed February 23, 1904. Serial No. 194,794. (No model.)

*To all whom it may concern:*

Be it known that I, JOHN SPLITDORF, a citizen of the United States of America, and a resident of the borough of Manhattan, in the city, county, and State of New York, have invented certain new and useful Improvements in Induction-Coils, of which the following is a specification.

This invention relates to induction-coils equipped with a main and auxiliary condenser; and it consists in a specific arrangement of my devices disclosed in my original patent in this art, No. 732,014, dated June 23, 1903, the particular feature of modification herein represented residing in the relative electrical arrangement of the auxiliary condenser with respect to the main condenser and the other component elements of the coil.

The purpose of my present invention corresponds with that of my said former patent, but provides for the arrangement of the auxiliary condenser in series with the main condenser and the primary winding instead of being in parallel relation thereto, said auxiliary condenser being connected around the mechanical make-and-break device in a gas-engine circuit to allow the operation of the induced circuit in a jump-spark coil whose primary circuit is closed between the vibrator and adjusting-screw.

Figure 1:
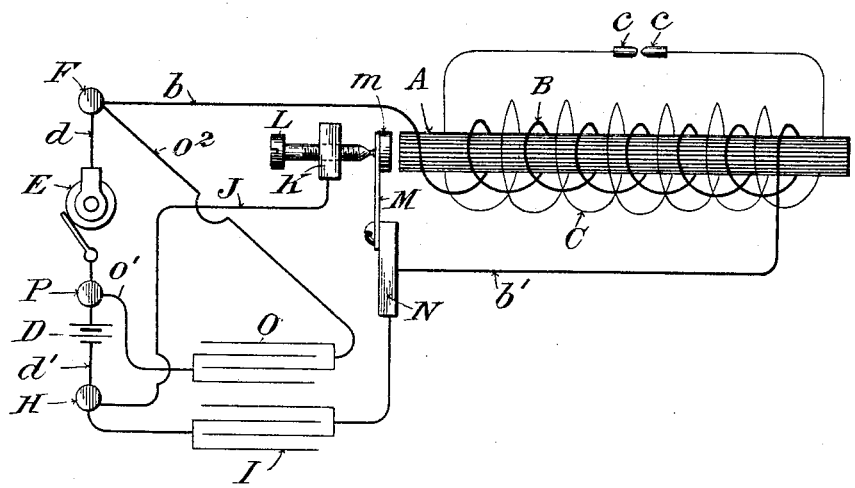
Figure 2:
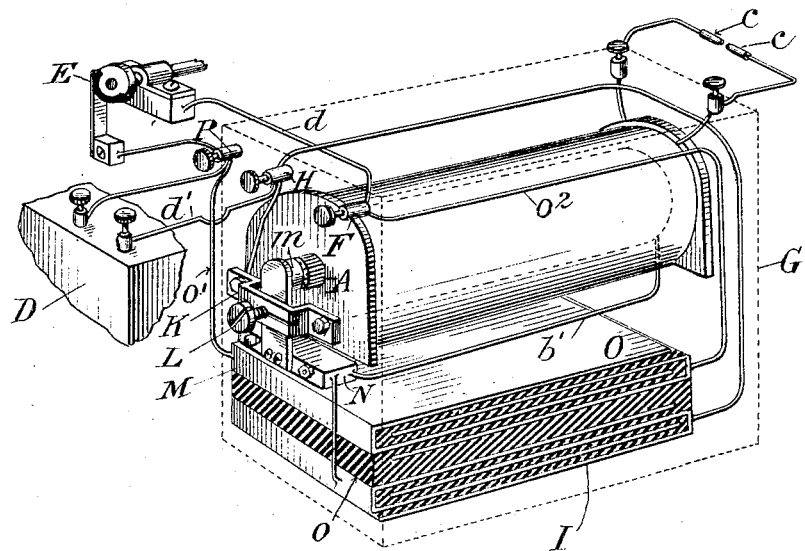

In the drawings accompanying this application Figure 1 is a diagrammatic view of an induction-coil with the various terminals and contacts and showing my auxiliary condenser in circuit, and Fig. 2 is an elevation of the same in perspective including the coil-casing.

In said views let A indicate the usual core composed of a bundle of soft-iron wires; B, the primary, and C the secondary, windings. The usual insulation of the wires themselves and intermediate the windings and the core will be understood as arranged in the usual manner.

$c$ $c$ indicate the terminals or opposed spark-points of the secondary winding.

D indicates a battery or other source of electrical energy, and E is intended to represent the usual make-and-break device located in the circuit between the primary and battery and arranged to be operated by a cam or other moving member of the engine equipment. A binding-post, as F, mounted upon the coil-casing G, receives the battery-terminal $d$ and the primary terminal $b$, while a binding-post, as H, receives the battery-terminal $d'$ and one end of a short connecting-wire J, whose opposite end is connected with the usual bridge, as K, which supports the adjusting-screw L. Said binding-post H receives a terminal of the usual condenser I, whose other terminal is connected with the mount or support N in the usual manner. The circuit is completed through the vibrator spring-arm M (carrying armature $m$) and its support N, the latter having connected therewith the terminal $b'$ of the primary.

So far we have described the usual component elements of a jump-spark coil, the operation of which is well known.

In incorporating my specific arrangement therein I provide an auxiliary condenser, as O, locating same—as, for instance, within the lower part of the casing G—either above or beneath the usual condenser, but separated therefrom, as by insulation $o$, or said auxiliary condenser being located exterior to casing G at any convenient point, it being unnecessary for said auxiliary condenser in the performance of its functions to be in contiguity to the usual condenser or to any other element of the coil. One terminal, $o^2$, of the auxiliary condenser connects with the binding-post F, while the opposite terminal, $o'$, connects with a binding-post P, that is located in the circuit between the battery and the make-and-break device E.

Thus, as will be apparent, the essence of the present modification of my previous patent lies in the connection of the auxiliary condenser around the engine make-and-break device or mechanical interrupter, whereby the auxiliary condenser is placed in series with the main condenser.

It will further be noticed that while one of the condensers is connected in parallel with the vibrator the other condenser is connected in parallel with the engine make-and-break device.

It will also be seen that the present application discloses a specific organization of the elements set forth in the broad patent already referred to.

Having now described my invention, I declare that what I claim is—

1. An auxiliary condenser for spark-coils, the opposite terminals of said condenser being, respectively, connected in the primary circuit at opposite sides of the engine make-and-break device.

2. A spark-coil having the usual primary and secondary windings and a pair of condensers, one of said condensers being connected in parallel with the vibrator, and the other condenser being connected in parallel with the engine make-and-break device.

3. The combination with a spark-coil, of a pair of condensers arranged in series with each other and with the primary of the spark-coil.

4. A spark-coil having the usual primary and secondary windings, and a pair of condensers in series with the primary and each other, in combination with the usual circuit making and breaking devices whereby a succession of discharges is made in the secondary circuit.

5. The combination with a spark-coil, of a condenser in series with the primary thereof, a short circuit adapted to cut out the said condenser, means for intermittently interrupting the short circuit, and an auxiliary condenser also in series with the primary, the said auxiliary condenser being adapted to be brought into action by an external make-and-break device independently of the means for intermittently interrupting the short circuit.

Signed at New York this 10th day of February, 1904.

JOHN SPLITDORF.

Witnesses:
F. W. BARKER,
FREDERICK C. BONNY.